(12) United States Patent
Perry (10) Patent No.: US 12,498,055 B2
(45) Date of Patent: Dec. 16, 2025

(54) VALVE TOOL FOR A LOAD LINE CONTAINER SYSTEM

(71) Applicant: Glen Wayne Perry, Bossier, LA (US)

(72) Inventor: Glen Wayne Perry, Bossier, LA (US)

( * ) Notice: Subject to any disclaimer, the term of this patent is extended or adjusted under 35 U.S.C. 154(b) by 8 days.

(21) Appl. No.: 18/825,694

(22) Filed: Sep. 5, 2024

(65) Prior Publication Data

US 2025/0075821 A1 Mar. 6, 2025

Related U.S. Application Data (60) Provisional application No. 63/580,468, filed on Sep. 5, 2023.

(51) Int. Cl.
| | |
|---|---|
| B67C 11/04 | (2006.01) |
| B67D 7/32 | (2010.01) |
| F16K 31/60 | (2006.01) |

(52) U.S. Cl.
CPC ............ F16K 31/605 (2013.01); B67C 11/04 (2013.01); B67D 7/3209 (2013.01)

(58) Field of Classification Search
CPC ............ F16K 31/605; Y10T 137/5762; Y10T 137/86348; Y10T 137/86308; B67D 7/3209; B67C 11/04
See application file for complete search history.

(56) References Cited

U.S. PATENT DOCUMENTS

| | | | |
|---|---|---|---|
| 5,313,991 A | 5/1994 | Murray et al. | |
| 5,647,412 A | 7/1997 | Brewer | |
| 7,673,658 B1 | 3/2010 | Brewer et al. | |
| 7,921,884 B2 | 4/2011 | Brewer et al. | |
| 9,151,428 B2 | 10/2015 | Brewer et al. | |
| 9,546,087 B1 * | 1/2017 | Tucker | B67D 7/3209 |
| 2006/0157112 A1 * | 7/2006 | Brewer | B61D 5/00 |
| | | | 137/312 |
| 2011/0232896 A1 | 9/2011 | Brewer et al. | |
| 2020/0055645 A1 | 2/2020 | Lane | |

OTHER PUBLICATIONS

International Search report mailed Nov. 25, 2024 in counterpart International PCT Patent Application No. PCT/US2024/045359, filed Sep. 5, 2024.

* cited by examiner

*Primary Examiner* — Marina A Tietjen
(74) *Attorney, Agent, or Firm* — Grady K. Bergen; Griggs Bergen LLP (57) ABSTRACT

A valve tool for a load line container system is used to prevent a container lid of the container system from being opened while the valve of a load line remains open. The valve tool has an elongated valve tool handle that is configured to extend over the container lid while the container lid is closed or partially closed and a valve engagement portion of the tool is engaged with a valve of the load line while the valve is in an open condition. This prevents the container lid from being opened while the valve remains open. To open the container lid, the valve tool handle must be rotated out of the way of the container lid, which causes the valve of the load line to be actuated to a closed condition.

20 Claims, 9 Drawing Sheets

VALVE TOOL FOR A LOAD LINE CONTAINER SYSTEM

CROSS-REFERENCE TO RELATED APPLICATIONS

This application claims the benefit of U.S. Provisional Patent Application No. 63/580,468, filed Sep. 5, 2023, which is incorporated herein by reference in its entirety for all purposes.

TECHNICAL FIELD

The invention relates to the containment of spills utilizing a load line container system, and more particularly, to the prevention of the inadvertent uncoupling of hoses and lines from the load line while the load line valve remains in an open condition.

BACKGROUND

In oil and gas production, spillage of liquid oil, wastewater or other chemicals becomes an environmental concern. In addition to oil, significant quantities of produced waters, such as saltwater, brine, etc., may be produced from the well. After their separation, these liquids are typically stored in storage tanks until they can be transported to the desired area for processing or disposal, often by tanker truck. A load line is typically provided on the storage tank through which the liquids are discharged and allowed to flow by opening a load line valve. The process of transferring these liquids from the storage tank to the tanker trailer involves connecting a transfer line from the tanker to the load line. On many storage tanks, the end of the load line where it is coupled to the transfer line is located within the interior of a load line pot or container system. These load line container systems are used to catch any spills of oil or water from leakage where the transfer line is coupled to the load line. Examples of such load line container systems are described in U.S. Pat. Nos. 5,647,412; 7,673,658; 7,921,884; and 9,151,428, which are each incorporated herein by reference in their entireties for all purposes.

The load line containers used to catch these spills are typically covered with a hinged lid. The lid prevents rain or precipitation from filling the load line containers, as well as preventing items or small animals from falling into the containers.

To couple and uncouple the transfer line from the load line, an operator must raise the container lid to access the load line discharge coupling, which is located within the interior of the load line container. Once the transfer line is coupled to the load line, the load line valve is opened to begin discharging liquids from the storage tank to the tanker. The load line valve is typically located exterior to the load line container. To operate the valve of the load line, the operator commonly uses a standard adjustable wrench.

Often the container lid is left open during the unloading process. If the operator forgets and fails to close the valve before disconnecting the transfer line from the load line, the remaining water or liquid can escape from the open load line, leading to spills and posing a potential hazard to the operator. The valve tool disclosed herein offers a more user-friendly solution, ensuring that the valve is properly closed before the transfer line can be uncoupled from the load line, thereby preventing spills and enhancing operator safety.

BRIEF DESCRIPTION OF THE DRAWINGS

For a more complete understanding of the embodiments described herein, and the advantages thereof, reference is now made to the following descriptions taken in conjunction with the accompanying figures, in which.

DETAILED DESCRIPTION

Figure 1:
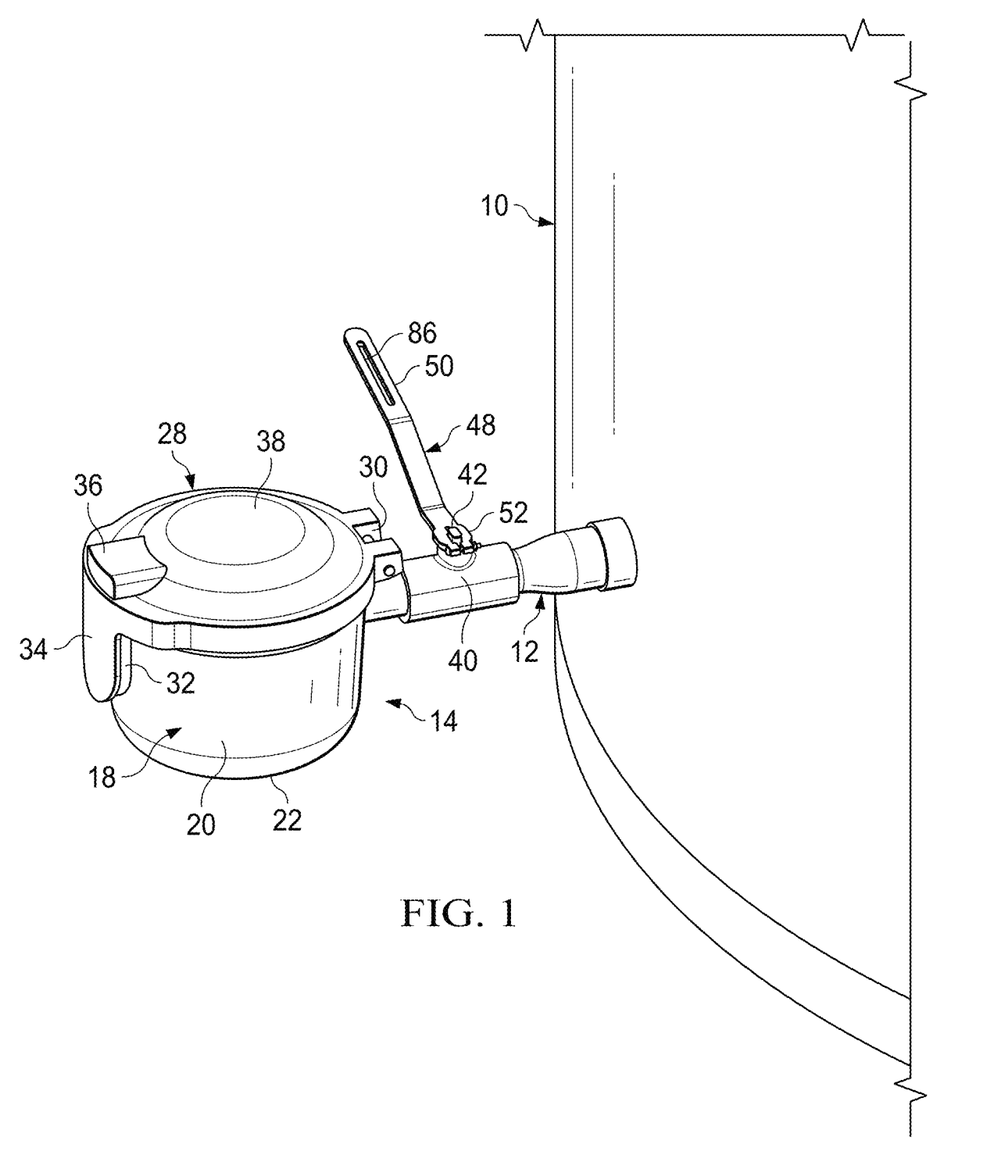
FIG. 1 is a perspective view of a storage tank employing a load line and load line container system, shown employing a load line valve tool constructed in accordance with particular embodiments engaged with the valve of the load line with the valve in a closed condition.

FIG. 1 shows a storage tank 10 used for containing large volumes of liquids. The storage tank 10 may be a production tank used in the oil and gas industry for storing or containing various liquids. This may include produced oil and/or waste waters, such as salt water, brine, etc. The storage tank 10 may be used for containing other liquids from other industries, however, such as chemical, food and beverage, agricultural, mining, etc. These may be aqueous or non-aqueous liquids. The storage tank 10 is shown with a load line 12 located at or near the bottom of the tank 10 for discharging liquids from the tank 10.

Figure 2:
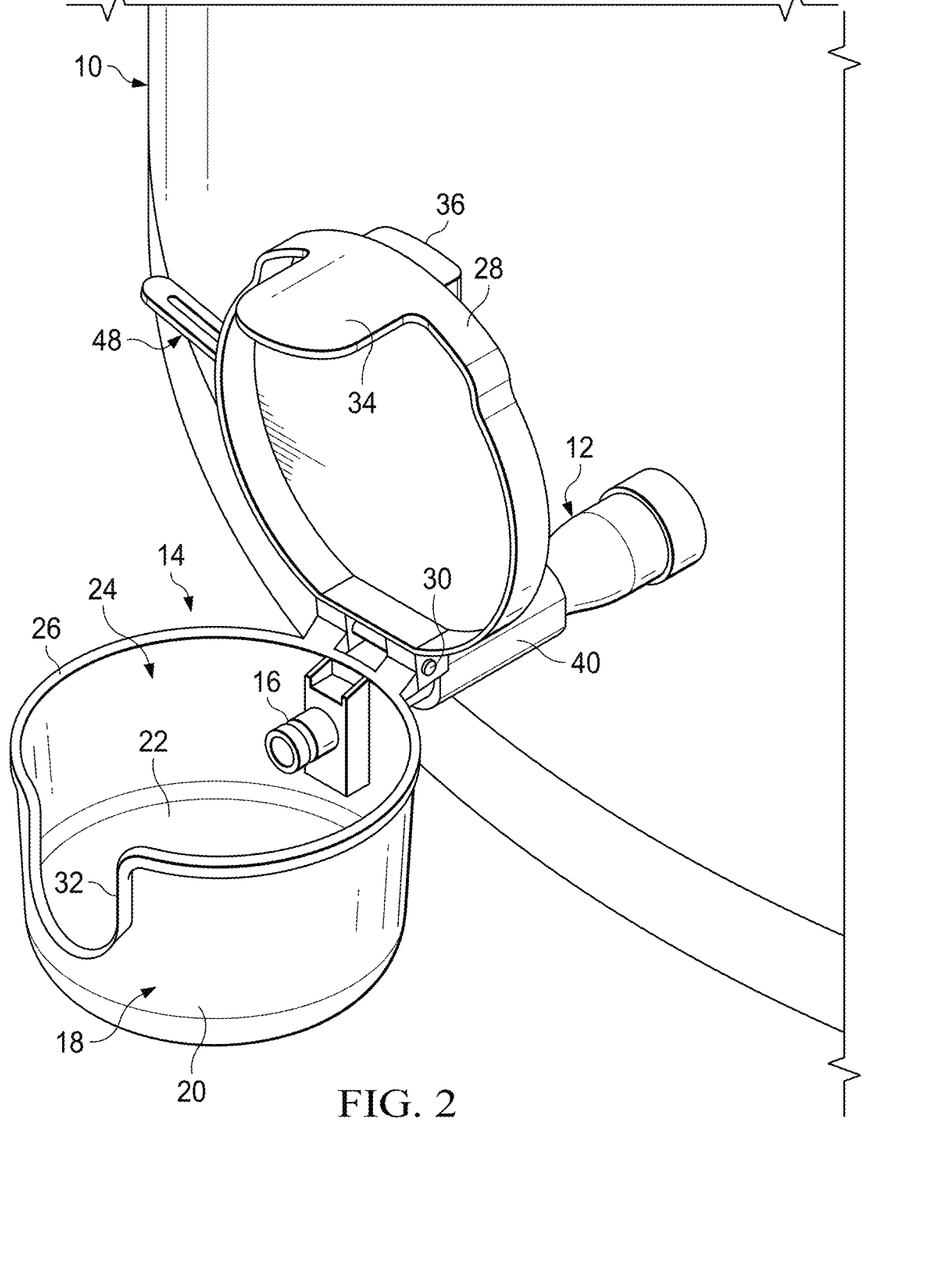
FIG. 2 is a perspective view of the storage tank, load line and load line container system of FIG. 1, with a container lid of the load line container system in an open position.

Referring to FIG. 2, the end of the load line 12 projects from the storage tank 10 and is disposed and housed within a load line container system 14. The projecting end of the load line 12 is provided with an end coupling 16, such as a quick release coupling, which is configured to couple to a transfer line, such as tanker truck hose.

The container system 14 is provided with the load line 12 to collect spills and leakage from the load line 12. The container system 14 includes a container body 18 having an upstanding sidewall 20, which may be generally cylindrical in shape, and a bottom 22 joined at a lower end of the upstanding sidewall 20 to define a container interior 24 for collecting spills or leaks when liquids are discharged from load line 12 of the storage tank 10. A rearward side opening or passage (not shown) is provided at the rear of the sidewall 20 of the container body 18 for receiving the projecting end of the load line 12 from the storage tank 10.

The container body 18 has an upper opening 26 to facilitate accessing a container interior 24. A container lid 28 of the container system 14 is pivotally mounted to the sidewall 20 by a hinge 30 so that the lid 28 can be pivotally moved between closed and open positions to selectively open and close the upper opening 26 of the container body 18.

A forward side opening 32 is formed in a forward portion of the side wall 20 of the container body 18 and is sized and configured to accommodate a transfer line that extends into the container interior 24. A downward projecting flap 34 of the lid 28 is configured to cover the side opening 32 when the lid is in a fully closed position. The lid 28 may also be provided with a handle 36 to facilitate lifting and closing of the lid 28. The upper surface 38 of the container lid 28 may be configured in a sloped or domed shape having contours so that rain or other precipitation flows off the lid 28 and does not collect on the surface 38.

As shown in FIG. 1, a valve 40 (e.g., ball valve) is provided on the load line 12 for regulating the flow of liquids through the load line 12. An external valve stem 42 projects from the valve 40 to actuate the valve 40 between open and closed conditions to control or regulate the flow of liquids through the load line 12. The valve 40 and valve stem 42 are located exteriorly from the container interior 24, as shown.

Figure 3:
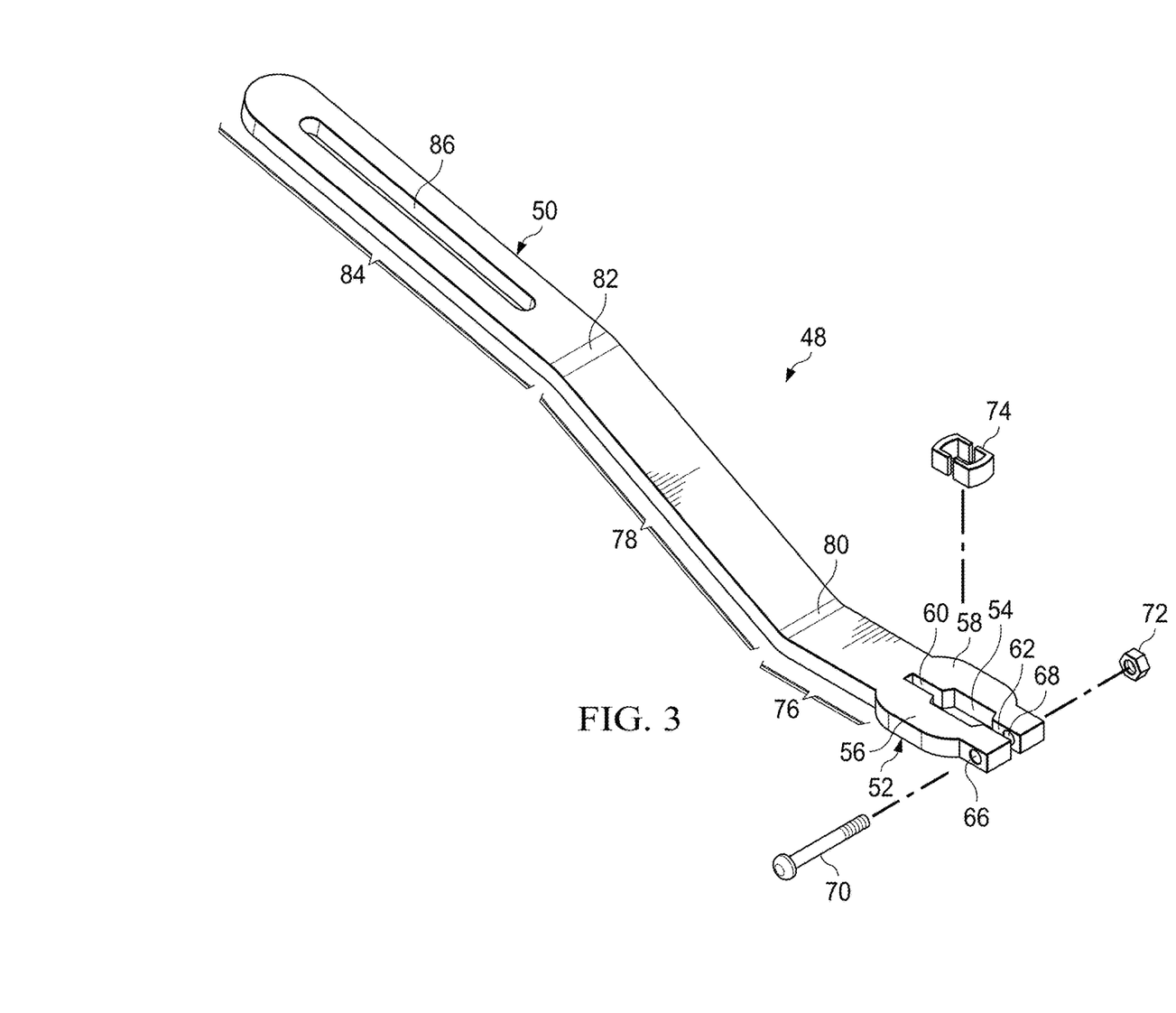
FIG. 3 is a perspective view of the load line valve tool of FIG. 1.
Figure 4:
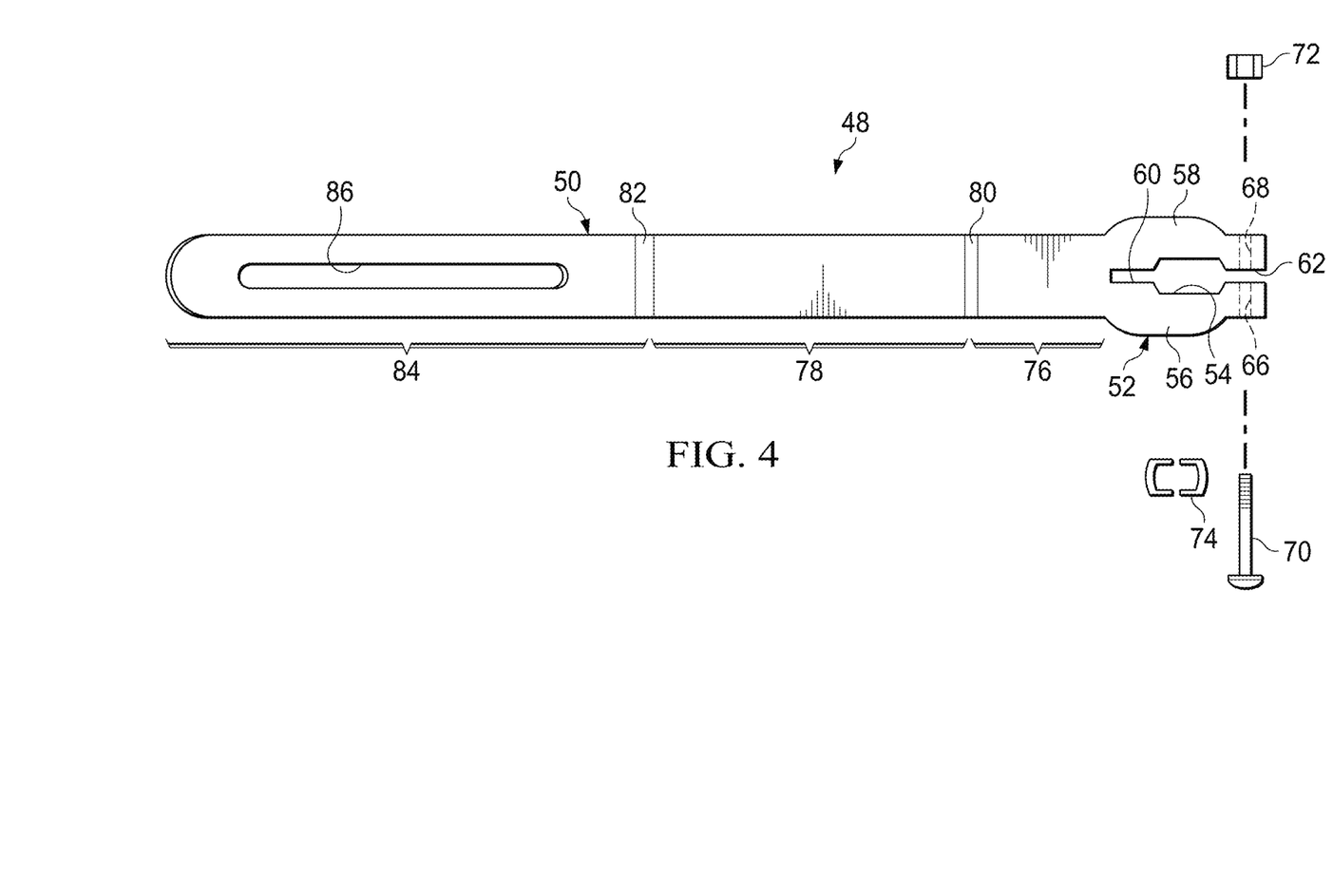
FIG. 4 is a top plan view of the load line valve tool of FIG. 3.
Figure 5:
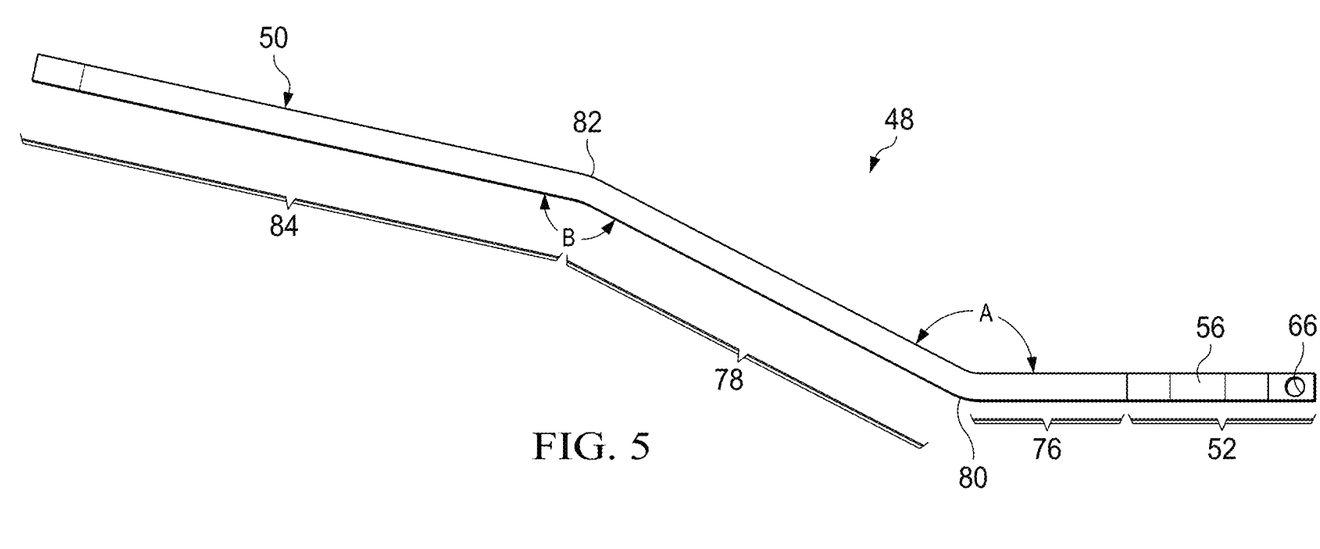
FIG. 5 a right side elevational view of the load line valve of FIG. 3.

A load line valve tool 48 that may be used with the load line container system 14 to actuate the valve 40. FIGS. 3-5 show a more detailed depiction of the valve tool 48. As shown, the valve tool 48 includes an elongated valve tool handle 50 with a valve engagement portion 52 located at a forward end of the tool 48. The valve tool 48 may be formed from a single, integral piece of metal, such as steel, mild steel, steel alloy, or another durable, strong material suitable for the uses and purposes described herein. All or portions of the valve tool 48 may be formed from a flat plate or piece of material having a sufficient thickness and strength to perform the functions and uses described herein. The valve tool 48 may have a uniform thickness along all or portions of its length.

In particular applications, a majority of the width of the valve tool 48 along its length may range from 0.75 inch to 4 inches, more particularly from 1 inch to 3 inches. In particular embodiments, the majority of the width of the valve tool 48 may be from at least, equal to, and/or between any two of 0.75 inches, 0.80 inches, 0.85 inches, 0.90 inches, 0.95 inches, 1.00 inch, 1.05 inches, 1.10 inches, 1.15 inches, 1.20 inches, 1.25 inches, 1.30 inches, 1.35 inches, 1.40 inches, 1.45 inches, 1.50 inches, 1.55 inches, 1.60 inches, 1.65 inches, 1.70 inches, 1.75 inches, 1.80 inches, 1.85 inches, 1.90 inches, 1.95 inches, 2.00 inches, 2.05 inches, 2.10 inches, 2.15 inches, 2.20 inches, 2.25 inches, 2.30 inches, 2.35 inches, 2.40 inches, 2.45 inches, 2.50 inches, 2.55 inches, 2.60 inches, 2.65 inches, 2.70 inches, 2.75 inches, 2.80 inches, 2.85 inches, 2.90 inches, 2.95 inches, 3.00 inches, 3.05 inches, 3.10 inches, 3.15 inches, 3.20 inches, 3.25 inches, 3.30 inches, 3.35 inches, 3.40 inches, 3.45 inches, 3.50 inches, 3.55 inches, 3.60 inches, 3.65 inches, 3.70 inches, 3.75 inches, 3.80 inches, 3.85 inches, 3.90 inches, 3.95 inches, and 4.00 inches.

All or portions of the tool 48 may be laser cut, machined or otherwise formed into the shape shown in FIGS. 3-5. In other embodiments, the tool 48 or portions thereof may be formed from a combination of different materials, such as various metals and metal alloys, plastics, fiberglass, etc.

The engagement portion 52 of the tool 48 is configured to engage the valve 40 of the load line 12 to facilitate actuation of the valve 40. More specifically, the engagement portion 52 is configured to fit closely around and engage the valve stem 42 of the valve to facilitate rotating or turning of the valve stem 42 to actuate the valve 40.

In the embodiment shown, the engagement portion 52 may be configured as a flat plate having a thickness of from 0.2 inch to 1 inch, more particularly from 0.25 inch to 0.75 inch. In particular embodiments, the engagement portion 52 may be formed as a flat plate having a thickness from at least, equal to, and/or between any two of 0.20 inch, 0.25 inch, 0.30 inch, 0.35 inch, 0.4 inch, 0.45 inch, 0.50 inch, 0.55 inch, 0.60 inch, 0.65 inch, 0.70 inch, 0.75 inch, 0.80 inch, 0.85 inch, 0.90 inch, 0.95 inch, and 1.00 inch.

The valve engagement portion 52 includes a valve stem opening 54 at or near the center of the flat plate forming the engagement portion 52 that is configured to closely receive the valve stem 42 of the valve 40. The opening 54 may have a generally rectangular configuration to accommodate the rectangular shape of the valve stem 42 with which it is used. In certain instances, the opening 54 may have a length of from 0.5 inch to 2.5 inches, more particular from 1 inch to 2 inches. In some embodiments, the opening 54 may have a length at least, equal to, and/or between any two of 0.50 inch, 0.55 inch, 0.60 inch, 0.65 inch, 0.70 inch, 0.75 inch, 0.80 inch, 0.85 inch, 0.90 inch, 0.95 inch, 1.00 inch, 1.05 inches, 1.10 inches, 1.15 inches, 1.20 inches, 1.25 inches, 1.30 inches, 1.35 inches, 1.40 inches, 1.45 inches, 1.50 inches, 1.55 inches, 1.60 inches, 1.65 inches, 1.70 inches, 1.75 inches, 1.80 inches, 1.85 inches, 1.90 inches, 1.95 inches, 2.00 inches, 2.05 inches, 2.10 inches, 2.15 inches, 2.20 inches, 2.25 inches, 2.30 inches, 2.35 inches, 2.40 inches, 2.45 inches, and 2.50 inches.

The width of the opening 52 may be from 0.2 inch to 1.5 inches, more particularly from 0.5 inches to 1 inch. In particular embodiments, the opening 54 may have a width at least, equal to, and/or between any two of 0.20 inch, 0.25 inch, 0.30 inch, 0.35 inch, 0.4 inch, 0.45 inch, 0.50 inch, 0.55 inch, 0.60 inch, 0.65 inch, 0.70 inch, 0.75 inch, 0.80 inch, 0.85 inch, 0.90 inch, 0.95 inch, 1.00 inch, 1.05 inches, 1.10 inches, 1.15 inches, 1.20 inches, 1.25 inches, 1.30 inches, 1.35 inches, 1.40 inches, 1.45 inches, 1.50 inches, 1.55 inches, 1.60 inches, 1.65 inches, 1.70 inches, 1.75 inches, 1.80 inches, 1.85 inches, 1.90 inches, 1.95 inches, 2.00 inches, 2.05 inches, 2.10 inches, 2.15 inches, 2.20 inches, 2.25 inches, 2.30 inches, 2.35 inches, 2.40 inches, 2.45 inches, and 2.50 inches.

The opening 54 may be provided between a pair of spaced-apart, opposing jaws or arms 56, 58 of the engagement portion 52 formed from the flat plate material. The length of each of the jaws or arms 56, 58 is oriented non-transversely to the length of the handle 50 or along lines that lie in a plane parallel, or generally parallel, to a plane in which lines extending along the length of the handle 50 lie. To give the jaws or arms 56, 58 a degree of flexibility, narrow slits 60, 62 may extend from either end of the opening 54 along the length of the arms or jaws 56, 58. This creates a gap that enables the jaws or arms 60, 62 to expand and contract slightly when pressure is applied to them. The slits 60, 62 are narrower in width than the opening 54 to prevent the valve stem 42 from entering and getting caught within the slits 60, 62. The valve stem 42 and/or opening 54 will be non-circular or configured, such as with corresponding surface flats or areas, to prevent relative rotation of the valve stem 42 within the opening 54.

The overall length of the jaws 56, 58 may range from 1 inch to 6 inches, more particularly from 2 inches to 4 inches. In some embodiments, the jaws or arms 56, 58 may have a length at least, equal to, and/or between any two of 1.00 inch, 1.05 inches, 1.10 inches, 1.15 inches, 1.20 inches, 1.25 inches, 1.30 inches, 1.35 inches, 1.40 inches, 1.45 inches, 1.50 inches, 1.55 inches, 1.60 inches, 1.65 inches, 1.70 inches, 1.75 inches, 1.80 inches, 1.85 inches, 1.90 inches, 1.95 inches, 2.00 inches, 2.05 inches, 2.10 inches, 2.15 inches, 2.20 inches, 2.25 inches, 2.30 inches, 2.35 inches, 2.40 inches, 2.45 inches, 2.50 inches, 2.55 inches, 2.60 inches, 2.65 inches, 2.70 inches, 2.75 inches, 2.80 inches, 2.85 inches, 2.90 inches, 2.95 inches, 3.00 inches, 3.05 inches, 3.10 inches, 3.15 inches, 3.20 inches, 3.25 inches, 3.30 inches, 3.35 inches, 3.40 inches, 3.45 inches, 3.50 inches, 3.55 inches, 3.60 inches, 3.65 inches, 3.70 inches, 3.75 inches, 3.80 inches, 3.85 inches, 3.90 inches, 3.95 inches, 4.00 inches, 4.05 inches, 4.10 inches, 4.15 inches, 4.20 inches, 4.25 inches, 4.30 inches, 4.35 inches, 4.40 inches, 4.45 inches, 4.50 inches, 4.55 inches, 4.60 inches, 4.65 inches, 4.70 inches, 4.75 inches, 4.80 inches, 4.85 inches, 4.90 inches, 4.95 inches, 5.00 inches, 5.05 inches, 5.10 inches, 5.15 inches, 5.20 inches, 5.25 inches, 5.30 inches, 5.35 inches, 5.40 inches, 5.45 inches, 5.50 inches, 5.55 inches, 5.60 inches, 5.65 inches, 5.70 inches, 5.75 inches, 5.80 inches, 5.85 inches, 5.90 inches, 5.95 inches, and 6.00 inches.

The forward or free ends of the jaws or arms 56, 58 on either side of the slit 62 may be provided with transverse aligned bolt holes 66, 68 for receiving a bolt 70 or other fastener for drawing the jaws or arms 56, 58 together. The bolt 70 may be passed through the holes 66, 68 and secured by a nut 72. In some embodiments, one of the holes 66, 68 may be internally threaded so that the bolt 70 extends into and threads into the threaded hole, eliminating the need for the nut 72. Other fastening means could also be used to selectively draw the jaws or arms 56, 58 together. The bolt 70 or other fastening means allows the valve engagement portion 52 to be securely tightened around the valve stem 42 so that it cannot be readily removed.

In certain applications, the valve engagement portion 52 may be releasably coupled to the valve stem but may be selectively secured or locked to the valve stem 42 in a manner so that it is not readily removable to prevent unauthorized removable of the tool 48 from the valve stem 42. For example, the bolt 70 or fastener discussed previously for drawing the jaws or arms 56, 58 of the valve engagement portion 52 together may be configured or be provided with a security or locking mechanism, such as a lockable shroud, padlock, etc., so that the bolt 70 or fastener cannot be accessed, loosened or removed.

In the embodiment shown, the area around the valve stem opening 54, as well as the slits 60, 62, may be reinforced. This may be provided by widened or thickened areas of all or portions of the jaws or arms 56, 58, as is shown. The widened or thickened areas of the jaws or arms 56, 58 adds strength and reinforcement to withstand high torque without bending or breaking of the jaws or arms 56, 58. The overall width of this widened area of the jaws or arms 56, 58 at its greatest extent may range from 1.25 inches to 5 inches, more particularly from 2 inches to 4 inches. In particular embodiments, the overall width of this widened area of the jaws or arms 56, 58 at its greatest extent may be at least, equal to, and/or between any two of 1.25 inches, 1.30 inches, 1.35 inches, 1.40 inches, 1.45 inches, 1.50 inches, 1.55 inches, 1.60 inches, 1.65 inches, 1.70 inches, 1.75 inches, 1.80 inches, 1.85 inches, 1.90 inches, 1.95 inches, 2.00 inches, 2.05 inches, 2.10 inches, 2.15 inches, 2.20 inches, 2.25 inches, 2.30 inches, 2.35 inches, 2.40 inches, 2.45 inches, 2.50 inches, 2.55 inches, 2.60 inches, 2.65 inches, 2.70 inches, 2.75 inches, 2.80 inches, 2.85 inches, 2.90 inches, 2.95 inches, 3.00 inches, 3.05 inches, 3.10 inches, 3.15 inches, 3.20 inches, 3.25 inches, 3.30 inches, 3.35 inches, 3.40 inches, 3.45 inches, 3.50 inches, 3.55 inches, 3.60 inches, 3.65 inches, 3.70 inches, 3.75 inches, 3.80 inches, 3.85 inches, 3.90 inches, 3.95 inches, 4.00 inches, 4.05 inches, 4.10 inches, 4.15 inches, 4.20 inches, 4.25 inches, 4.30 inches, 4.35 inches, 4.40 inches, 4.45 inches, 4.50 inches, 4.55 inches, 4.60 inches, 4.65 inches, 4.70 inches, 4.75 inches, 4.80 inches, 4.85 inches, 4.90 inches, 4.95 inches, and 5.00 inches.

Because valve stems of load lines may be of different sizes or configurations, the valve tool 48 may be provided with one or more inserts or shims 74. For instance, commonly used valves of load lines may be four-inch or three-inch valves, each having different size valve stems. The valve engagement portion 52 without any insert or shim may be sized and configured to accommodate the larger four-inch valve stem. The insert or shim 74 may allow the tool 48 to be used with the smaller three-inch valve stem. The inserts or shims 74 are shown as being formed in two pieces or sections but may be a single piece, as well. The inserts or shims 74 are configured to be received within the valve stem opening 54 to decrease its size and/or change its configuration to receive a smaller or different sized or configured valve stem.

In particular embodiments, the valve engagement portion 52 may be non-releasable and stationarily mounted to the handle 50. In other embodiments, the valve engagement portion 52 may be movably (e.g., flex-head) and/or releasably mounted to the tool handle, such as a releasable socket head or wrench head, which can be removed and interchanged with other sockets or wrench heads of different sizes or configurations. Releasable coupling means may be provided for releasably coupling the valve engagement portion 52 to the handle 50.

The valve engagement portion 52 may be non-adjustable or adjustable to accommodate valves or valve stems of different configurations. While a particular configuration for the valve engagement portion 52 is shown, the valve engagement portion 52 may have a variety of configurations, including, but no limited to, a valve-stem wrench, an open-end wrench, a flex-head wrench, a closed/box-end wrench, a ratcheting wrench, a socket, a ratcheting socket, an adjustable wrench, a spanner wrench, a pipe wrench, etc.

In some embodiments, a second valve engagement portion (not shown), which may be similar to the valve engagement portion 52, may be provided on the opposite end of the handle 50. This second valve engagement portion may be configured to accommodate a different size or differently configured valve stem from that valve stem 42 used with the valve engagement portion 52.

The valve tool handle 50 extends from valve engagement portion 52. In the embodiment shown, the valve tool handle 50 is configured to extend over the container lid 28 of the load line container system 14 and be in close proximity to the container lid 28 when the valve engagement portion 52 is engaged with the valve 40 of the load line 12 while the valve 40 is in an open condition and the container lid 28 is in a closed or partially closed position. This prevents lifting of the lid 28 from the closed or partially closed position to access the container interior 24 though the upper opening 26.

To achieve this, the valve tool handle 50 may be shaped or contoured to accommodate the contour or shape of the container lid 28 while it is in the closed or partially closed position. As shown in FIG. 1, the valve 40 and valve stem 42 are typically located at a position below the upper opening 26 of the container body 18 and lid 28. Moreover, the container lid 28 may have a sloped or dome shape, which is not flat or level.

As shown in FIG. 5, the valve tool handle 50 may be formed from a length of flat metal plate material (e.g., mild steel) having a generally rectangular transverse cross section along its length, which may be the same or different from the material of the valve engagement portion 52. All or portions of the handle 50 may be formed from those materials described previously. The valve tool handle 50 may have a uniform thickness along all or portions of its length. In other embodiments, the tool handle 50 may have different thicknesses along its length and width. The tool handle 50 may be formed from the same contiguous piece of material as the tool engagement portion 52 and have the same or a similar thickness and width. This may be a thickness of from 0.2 inch to 1 inch, more particularly from 0.25 inch to 0.75 inch. In particular embodiments, the tool handle 50 may be formed as a flat metal plate having a thickness from at least, equal to, and/or between any two of 0.20 inch, 0.25 inch, 0.30 inch, 0.35 inch, 0.4 inch, 0.45 inch, 0.50 inch, 0.55 inch, 0.60 inch, 0.65 inch, 0.70 inch, 0.75 inch, 0.80 inch, 0.85 inch, 0.90 inch, 0.95 inch, and 1.00 inch. In other embodiments, all or portions of the handle 50 may have a non-flat or non-rectangular transverse cross section, such as a circular, oval, polygonal, D-shaped, etc., along all or a portion of its length.

The width of the tool handle 50 may be from 0.75 inch to 4 inches, more particularly from 1 inch to 3 inches. In particular embodiments, the width of the tool handle 50 may be from at least, equal to, and/or between any two of 0.75 inches, 0.80 inches, 0.85 inches, 0.90 inches, 0.95 inches, 1.00 inch, 1.05 inches, 1.10 inches, 1.15 inches, 1.20 inches, 1.25 inches, 1.30 inches, 1.35 inches, 1.40 inches, 1.45 inches, 1.50 inches, 1.55 inches, 1.60 inches, 1.65 inches, 1.70 inches, 1.75 inches, 1.80 inches, 1.85 inches, 1.90 inches, 1.95 inches, 2.00 inches, 2.05 inches, 2.10 inches, 2.15 inches, 2.20 inches, 2.25 inches, 2.30 inches, 2.35 inches, 2.40 inches, 2.45 inches, 2.50 inches, 2.55 inches, 2.60 inches, 2.65 inches, 2.70 inches, 2.75 inches, 2.80 inches, 2.85 inches, 2.90 inches, 2.95 inches, 3.00 inches, 3.05 inches, 3.10 inches, 3.15 inches, 3.20 inches, 3.25 inches, 3.30 inches, 3.35 inches, 3.40 inches, 3.45 inches, 3.50 inches, 3.55 inches, 3.60 inches, 3.65 inches, 3.70 inches, 3.75 inches, 3.80 inches, 3.85 inches, 3.90 inches, 3.95 inches, and 4.00 inches. The non-widened portions of the valve engagement portion 52 may have the same or similar width to that of the tool handle 50.

In the embodiment shown, the handle 50 has a first handle section 76 that joins and extends from the rearward end of valve engagement portion 52, which in the embodiment shown ends at the rearward end of the slit 60. The adjoining handle section 76 may be a straight, planar section that lies in the same plane as the valve engagement portion 52. The adjoining handle section 76 may have a length of from 1 inch to 8 inches, more particularly from 2 inches to 4 inches. In particular embodiments, the adjoining handle section 76 may have a length from at least, equal to, and/or between any two of 1.0 inch, 1.1 inches, 1.2 inches, 1.3 inches, 1.4 inches, 1.5 inches, 1.6 inches, 1.7 inches, 1.8 inches, 1.9 inches, 2.0 inches, 2.1 inches, 2.2 inches, 2.3 inches, 2.4 inches, 2.5 inches, 2.6 inches, 2.7 inches, 2.8 inches, 2.9 inches, 3.0 inches, 3.1 inches, 3.2 inches, 3.3 inches, 3.4 inches, 3.5 inches, 3.6 inches, 3.7 inches, 3.8 inches, 3.9 inches, 4.0 inches, 4.1 inches, 4.2 inches, 4.3 inches, 4.4 inches, 4.5 inches, 4.6 inches, 4.7 inches, 4.8 inches, 4.9 inches, 5.0 inches, 5.1 inches, 5.2 inches, 5.3 inches, 5.4 inches, 5.5 inches, 5.6 inches, 5.7 inches, 5.8 inches, 5.9 inches, 6.0 inches, 6.1 inches, 6.2 inches, 6.3 inches, 6.4 inches, 6.5 inches, 6.6 inches, 6.7 inches, 6.8 inches, 6.9 inches, 7.0 inches, 7.1 inches, 7.2 inches, 7.3 inches, 7.4 inches, 7.5 inches, 7.6 inches, 7.7 inches, 7.8 inches, 7.9 inches, 8.0 inches.

In the embodiment shown, the valve tool handle 50 may have an intermediate section 78 that extends rearward from the adjoining handle section 76 and projects upward. The intermediate section 78 may be a straight, planar section that extends from the adjoining section 76 at a first upward bend or curve 80. This bend or curve 80 in the handle 50 causes the intermediate section 78 of the tool handle 50 to be oriented at an upward angle A (FIG. 5). The upward angle A is measured between a line drawn along the length and between the ends of the intermediate section 78 and a line drawn between the ends of the adjoining handle section 76. The angle A may range from 10° to 45°, with a preferred range of 20° to 30° In certain embodiments, the angle A provided by the bend or curve 80 may be from at least, equal to, and/or between any two of 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, and 45°.

The intermediate section 78 terminates at its rearward end at a downward bend or curve 82 where it is joined by an end section 84 of the tool handle 50 that extends downward. The end section 84 may be a straight, planar section that extends from the intermediate section 78 at the downward bend or curve 82. This bend or curve in the handle 50 angles the end section 84 of the tool handle 50 downward at a downward angle B (FIG. 5). The angle B is measured between a line drawn along the length and extending between the ends of the end section 84 and a line drawn between the ends of the intermediate handle section 78. This downward angle B may be from 10° to 45°, more particularly from 10° to 30°. In certain embodiments, the downward angle B provided by the bend or curve 80 of the intermediate section 78 relative to the adjoining section 76 may be from at least, equal to, and/or between any two of 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, and 45°.

In the embodiment shown, the overall length of each of the intermediate handle section 78 and end section 84 may range from 3 inches to 12 inches or more, more particular from 3 inches to 10 inches. In particular embodiments, each of the intermediate section 76 and end section 84 may have a length from at least, equal to, and/or between any two of 3.0 inches, 3.1 inches, 3.2 inches, 3.3 inches, 3.4 inches, 3.5 inches, 3.6 inches, 3.7 inches, 3.8 inches, 3.9 inches, 4.0 inches, 4.1 inches, 4.2 inches, 4.3 inches, 4.4 inches, 4.5 inches, 4.6 inches, 4.7 inches, 4.8 inches, 4.9 inches, 5.0 inches, 5.1 inches, 5.2 inches, 5.3 inches, 5.4 inches, 5.5 inches, 5.6 inches, 5.7 inches, 5.8 inches, 5.9 inches, 6.0 inches, 6.1 inches, 6.2 inches, 6.3 inches, 6.4 inches, 6.5 inches, 6.6 inches, 6.7 inches, 6.8 inches, 6.9 inches, 7.0 inches, 7.1 inches, 7.2 inches, 7.3 inches, 7.4 inches, 7.5 inches, 7.6 inches, 7.7 inches, 7.8 inches, 7.9 inches, 8.0 inches, 8.1 inches, 8.2 inches, 8.3 inches, 8.4 inches, 8.5 inches, 8.6 inches, 8.7 inches, 8.8 inches, 8.9 inches, 9.0 inches, 9.1 inches, 9.2 inches, 9.3 inches, 9.4 inches, 9.5 inches, 9.6 inches, 9.7 inches, 9.8 inches, 9.9 inches, 10.0 inches, 10.1 inches, 10.2 inches, 10.3 inches, 10.4 inches, 10.5 inches, 10.6 inches, 10.7 inches, 10.8 inches, 10.9 inches, 11.0 inches, 11.1 inches, 11.2 inches, 11.3 inches, 11.4 inches, 11.5 inches, 11.6 inches, 11.7 inches, 11.8 inches, 11.9 inches, and 12.0 inches.

In some embodiments, additional tool handle sections may be used, such as described in U.S. Provisional Patent Application No. 63/580,468. Thus, a further upward extending end section may be joined at the end section 84 at similar angles to the angles A and B.

The entire overall length of the valve tool handle 50 may range from 12 to 36 inches. In particular embodiments, overall length of the valve tool handle 50 may be from at least, equal to, and/or between any two of 12 inches, 12.5 inches, 13 inches, 13.5 inches, 14 inches, 14.5 inches, 15 inches, 15.5 inches, 16 inches, 16.5 inches, 17 inches, 17.5 inches, 18 inches, 18.5 inches, 19 inches, 19.5 inches, 20 inches, 20.5 inches, 21 inches, 21.5 inches, 22 inches, 22.5 inches, 23 inches, 23.5 inches, 24 inches, 24.5 inches, 25 inches, 25.5 inches, 26 inches, 26.5 inches, 27 inches, 27.5 inches, 28 inches, 28.5 inches, 29 inches, 29.5 inches, 30 inches, 30.5 inches, 31 inches, 31.5 inches, 32 inches, 32.5 inches, 33 inches, 33.5 inches, 34 inches, 34.5 inches, 35 inches, 35.5 inches, and 36 inches.

In the embodiment shown, an elongated slot or opening 86 is provided in the center of the end section 84 of the tool handle 50 that extends along a portion of the length of the section 84. Additional slots, holes or other openings may be provided in the same or other sections of the tool handle 50. This may help reduce the weight of the tool 50, as well as provide a gripping area or areas where another device, such as a hook, tool, flexible line, etc., can be inserted or secured to increase leverage when additional force is needed or provide a more secure grip. Such slots or openings also allow the tool to be hung or positioned on a hook, peg or other device for storage. The slot or opening 86 may also be sized and/or configured as second valve engagement portion.

Other configurations, shapes, sizes, lengths, angles, etc., for the valve tool handle 50 and valve tool handle sections may be used to accommodate differently configured and sizes of load line container systems, as one skilled in the art will appreciate. For instance, instead of several bends or curves along the length of the tool handle 50, the tool handle may be configured as one long continuous arc or curved member that extends over the container lid 28. Alternatively, the handle may have fewer or more bends or curves than those shown. Additionally, instead of the sections 76, 78, 84 of the tool handle 50 being straight, they may be curved or arcuate along all or a portion of their lengths.

Figure 6:
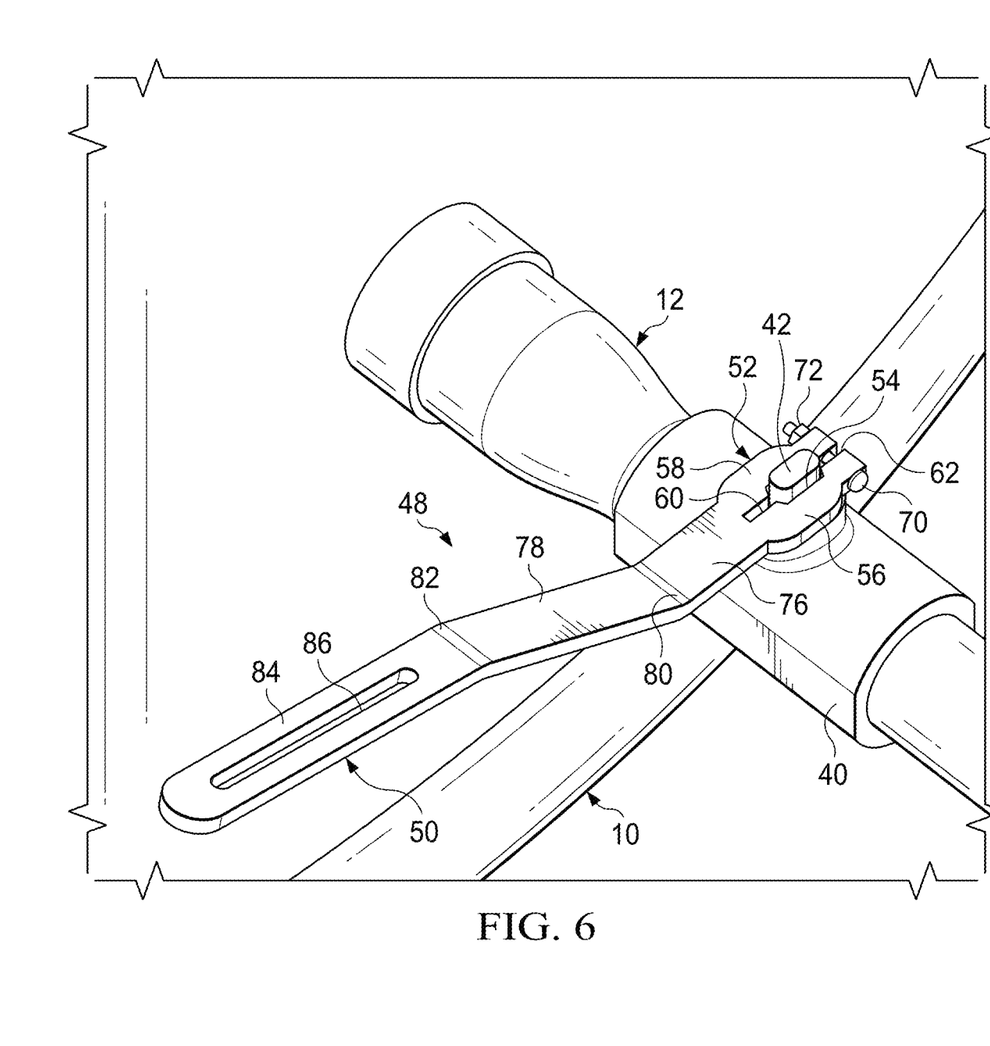
FIG. 6 is an enlarged perspective view of the load line valve tool engaged with the valve of the load line, shown with the valve in the closed condition.

As shown in FIG. 6, during use, the valve tool 48 is engaged with load line valve 40. When engaged, the valve stem 42 is received within the valve stem opening 54 and secured to the valve stem 42 of the load line valve 40, with or without the use of the shim or insert 74, as may be necessary. If desired, the jaws or arms 56, 58 can be tightened around the valve stem 42 through the use of the bolt and nut 70, 72.

The valve 40 of the load line 12 should initially be in the closed condition. In the closed condition, the length of the valve tool 48 is typically oriented generally perpendicular or 90° to the load line 12 or at a position away from the container lid 28, as shown in FIG. 1. When the valve tool handle 50 is in this position, the container lid 28 may be raised to an open position, as shown in FIG. 2.

Figure 7:
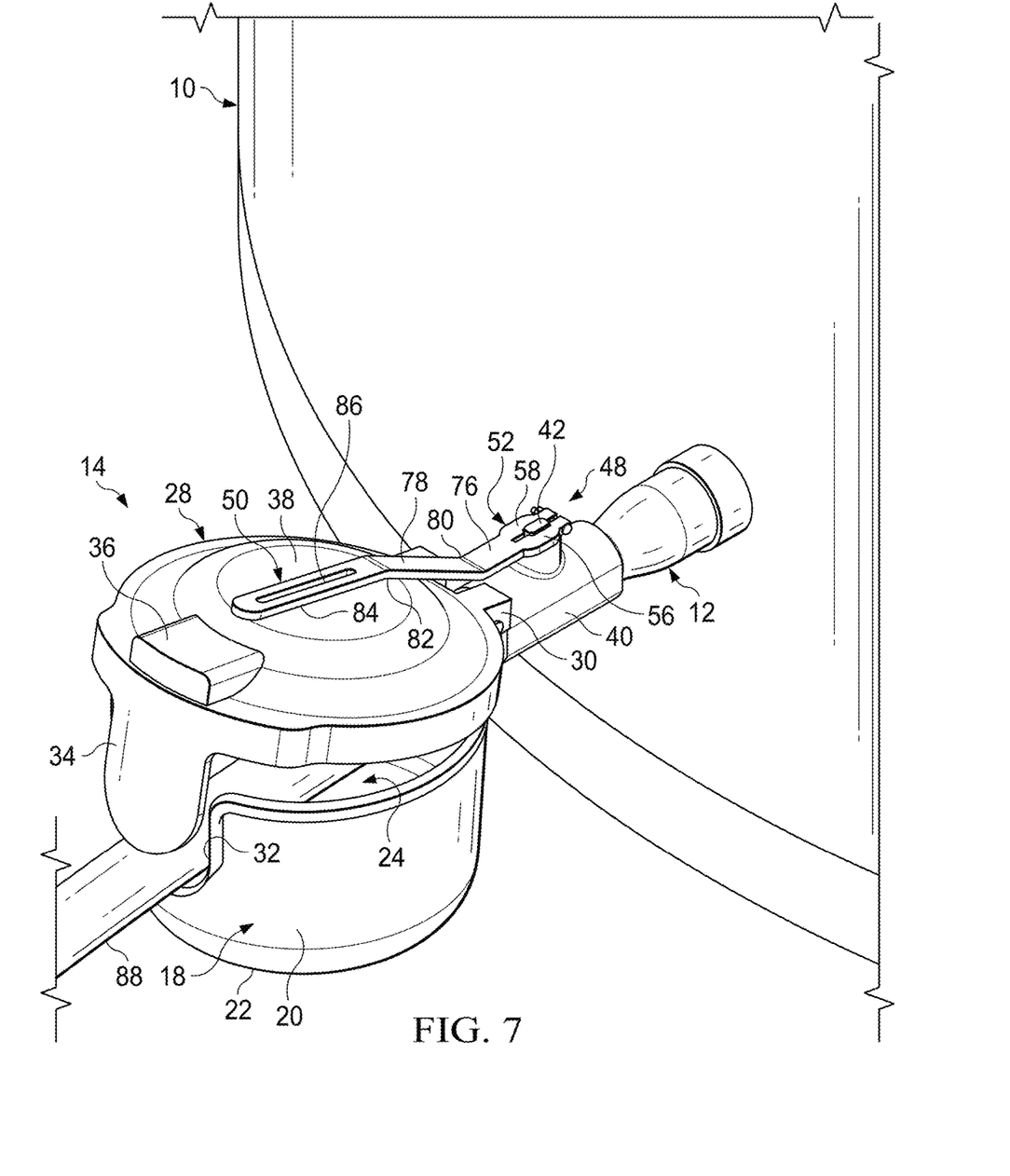
FIG. 7 is a perspective view of the storage tank, load line and load line container, shown with a transfer line that is coupled to the load line and extending from the load line container, with the container lid in a partially closed position.

With the container lid 28 in the open position, the operator can access the container interior 24. The operator can then pass a transfer line 88, such as the tanker hose of a tanker truck (as shown in FIG. 7), through the side opening 32 and connect it to the end of the load line 12 at the discharge coupling 16, which is located within the container interior 24. Additionally, the open container lid 28 will block the valve tool 48 from rotating, preventing the valve 40 from being opened while the lid 28 remains open.

With the transfer line 88 coupled to the load line 12, before the valve 40 can be actuated to the open condition to begin discharging liquids from the storage tank 10, the operator must first close the container lid 28, as shown in FIG. 7. With the transfer line 88 extending through side opening 32, the container lid flap 34 may rest on the transfer line 88 so that the container lid 28 may only be lowered to a partially closed position. In other instances, however, such in cases where there is no container lid flap or the flap 34 is configured to accommodate the transfer line 88, the container lid 28 may be moved to the fully closed position, wherein the lid 28 rests on the upper surface of the container wall 20.

With the container lid 28 fully closed or partially closed, the valve 40 is actuated to the open condition. This is achieved by rotating the valve tool 48 so that valve tool handle 50 passes and extends over the closed or partially closed container lid 28 of the load line container system 14. The elongated valve tool handle 50 is configured to extend over the container lid 28 when the lid is in a closed or partially closed position, while the load line 12 is connected to the transfer line 88. In this position, the valve tool handle 50 overlies and is in close proximity to the container lid 28, while the valve engagement portion 52 is engaged with the valve 40 of the load line 12. The valve tool handle 50 will typically be centered over the container lid 28 and oriented parallel with the load line 12 when the valve 40 is in a fully open condition.

The valve tool handle 50 should be in close enough proximity to (e.g., ≤½ inch, ≤¾ inch, ≤1 inch, ≤1½ inches, or ≤2 inches) and extend over the container lid 28 a distance sufficient to prevent the container lid 28 from being lifted to access the container interior 24. Thus, the handle 50 may extend across one-third, one-half, three-quarters, or the entire width or diameter of the container lid 28. The valve tool handle 50 may even extend beyond the width or diameter of the container lid 28 so that it projects a distance from the lid 28 and container body 18.

With the tool 48 remaining engaged with the load line valve 40, the valve tool handle 50 will remain at a position above the container lid 28 so that the lid 28 cannot be raised from the closed or partially closed position while the valve 40 is in an open or partially open condition. This restricts access to the container interior 24 through the upper opening 26. Because the container lid 28 must remain closed or partially closed while the valve 40 is in the open condition, the operator is protected from leaking spray or liquid discharge once the load line valve 40 is opened, such as may occur if the transfer line 88 is not securely coupled to the load line 12.

When it is desired to uncouple the transfer line 88 from the load line 12, the operator must rotate the tool handle 50 away from the container lid 28 of the container system 14 so that it is clear from the container lid 28. Rotation of the tool handle 50 away from the lid, causes the valve stem 42 of the valve 40 to be rotated to the closed condition. The operator can then lift the container lid 28 of the container system 14 to allow access to the container interior 24 to uncouple the transfer line from the load line coupling 16. This configuration prevents uncoupling the transfer line 88 from the load line 12 while the load line valve is in an open condition. Unwanted spills and leaks or the sudden release of pressurized liquids, which could endanger the operator, are thus prevented, as would occur if the transfer line is uncoupled while the load line valve remains open.

Once the transfer line is uncoupled, the container lid 28 may be closed to prevent rain or precipitation and unwanted items or small animals from entering the container interior 24. The valve tool 48 may be removed for use elsewhere or it may be left secured to the valve 40.

Figure 8:
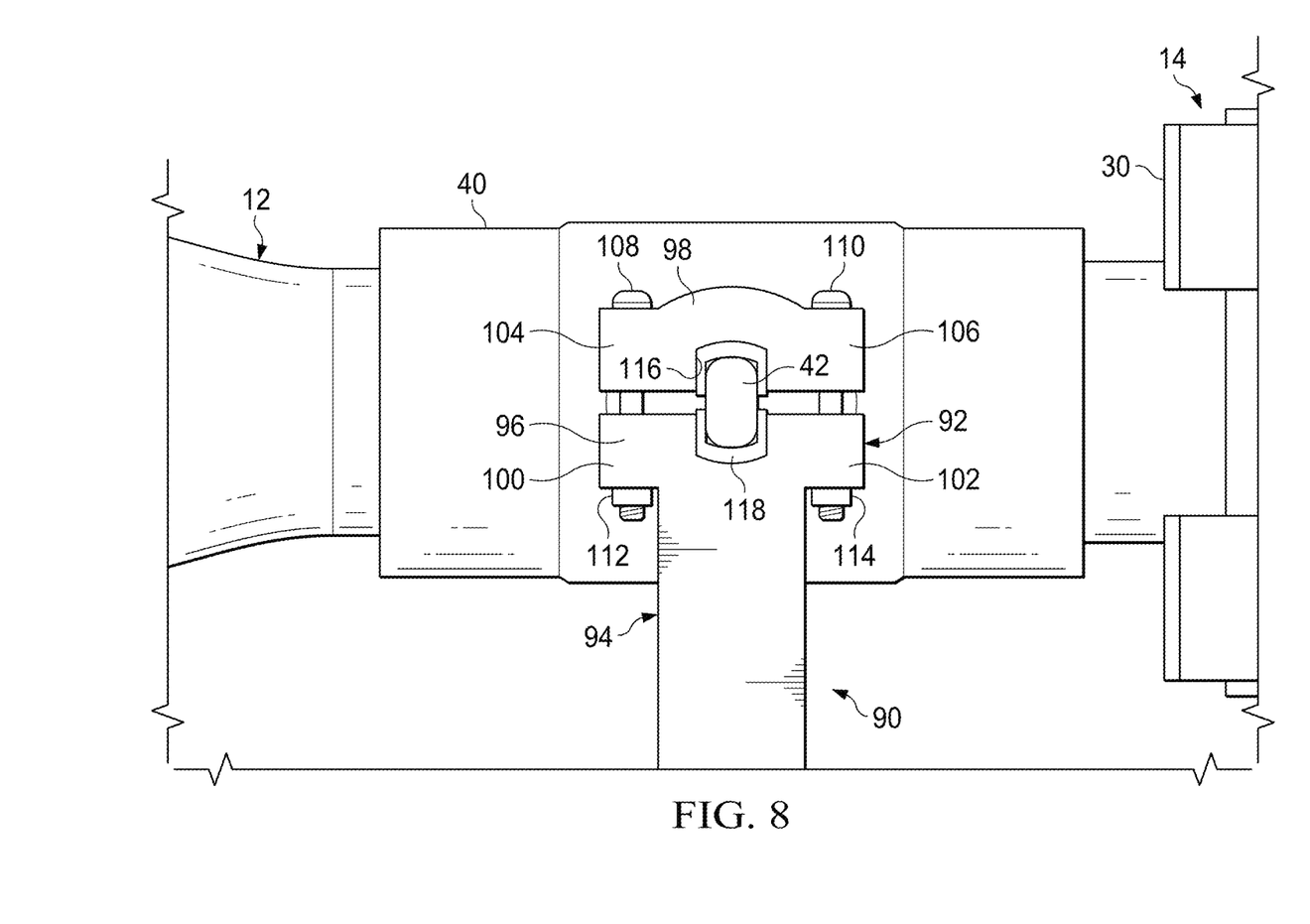
FIG. 8 is a top plan view of an alternative embodiment of a load line valve tool constructed in accordance with particular embodiments, shown engaged with the valve of the load line with the valve.

FIG. 8 shows an alternate embodiment of a load line valve tool 90 that may be used with the load line container system 14'. The valve tool 90 is similar to the valve tool 48 with similar components labeled with the same reference numerals. The valve tool 90 may be constructed of the same types of materials and have similar dimensions to those previously described for the valve tool 48. This may include the valve tool 90 or portions thereof being formed from a flat metal plate material.

Figure 9:
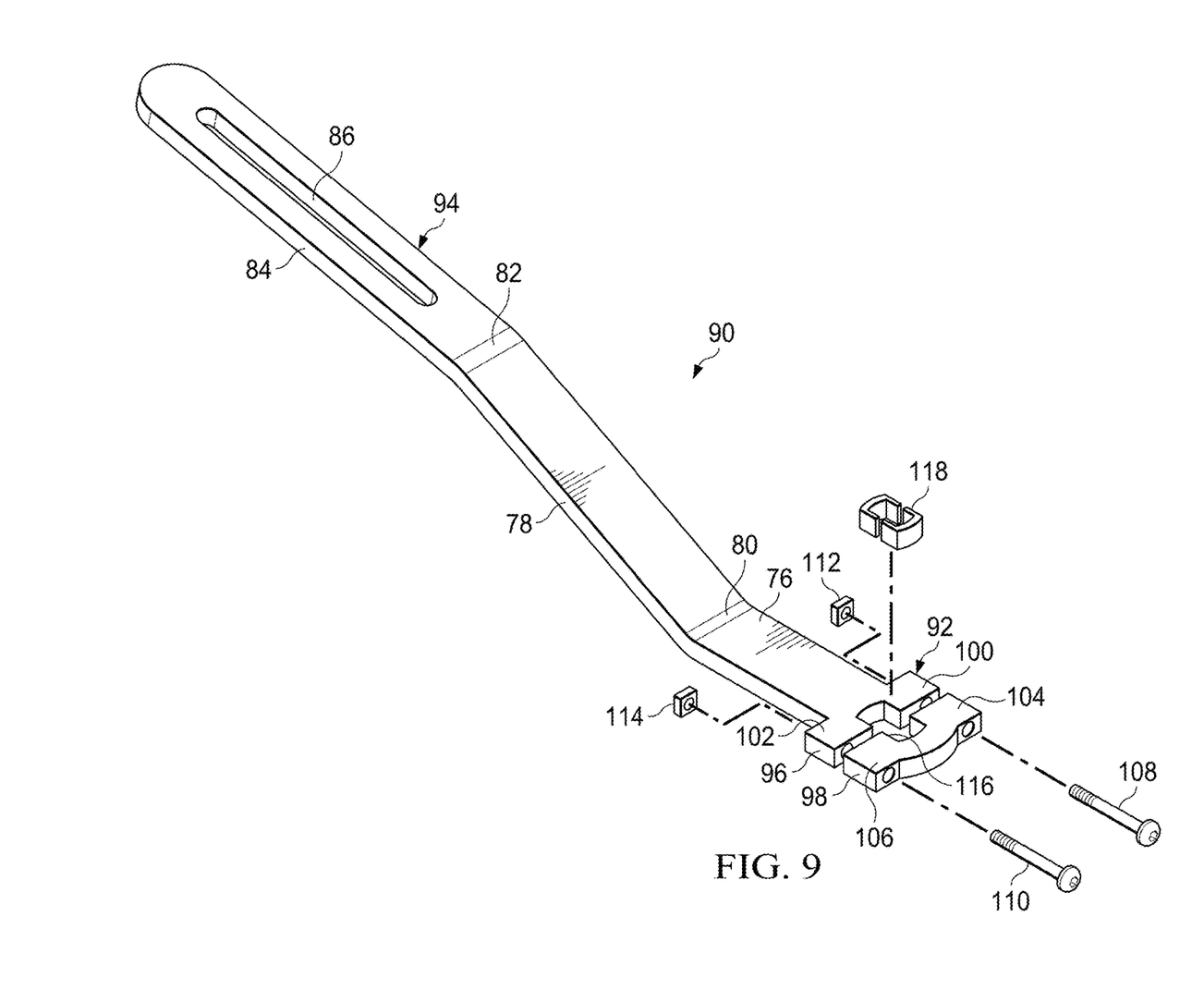
FIG. 9 is a perspective view of the load line valve tool of FIG. 8.

The valve tool 90 includes a valve engagement portion 92 located at the forward end of the tool 90, with a valve tool handle 94 extending from the valve engagement portion 92. The valve engagement portion 92 is formed from two opposing jaws or arms 96, 98. In the embodiment shown, the length of each of the jaws or arms 96, 98 may be the same, with the lengths of each jaw or arm 96, 98 being oriented transverse to the handle 94 or perpendicular, or generally perpendicular, the length of the handle 94. The jaws or arms 96, 98 may have a length that is wider than the width of the handle 94 so that the valve tool 90 has a generally T-shaped configuration, as shown.

In the embodiment shown, the jaw or arm 96 constitutes a rearward jaw or arm that may be integral with the tool handle 94. The jaw or arm 98, however, is formed as a separate piece of material or separate member from the remainder of the tool 90 so that it forms a removable forward arm or end cap of the tool 90. The jaws or arms 96, 98 are configured to abut against one another with opposite ends 100, 102 of the jaw or arm 96 abutting against opposite ends 104, 106 of the jaw or arm 98, respectively. The abutting ends 100, 102, 104, 106 form flanges for coupling the jaws or arms 96, 98 together.

Aligned bolt holes (not shown) may be formed in the ends 100, 104 and in the ends 102, 106, respectively, for receiving bolts 108, 110. Nuts, such as nuts 112, 114 may be threaded on each of the bolts 108, 110 to tighten and secure the jaws or arms 96, 98 together. In some embodiments, the bolt holes of one of the jaws or arms 96, 98 may be internally threaded, eliminating the need for the nuts 112, 114. Other fastening means could also be used to selectively secure and draw the jaws or arms 96, 98 together. Locking mechanisms or devices (not shown) may also be provided to prevent the unfastening or loosening the jaws or arms 96, 98.

A valve stem opening 116 of the valve engagement portion 92 is formed between the jaws or arms 96, 98. The opening 116 is formed from aligned slots formed in each of the jaws or arms 96, 98 that when joined together are configured to closely receive the valve stem 42 of the valve 40, as previously described. By tightening the jaws or arms 96, 98 around the valve stem 42, the valve stem 42 can be securely held in place within the opening 116.

As shown in FIG. 8, a shim or insert 118, which may be similarly configured to the shim or insert 74 previously described, may be used to accommodate different sized or configured valve stems.

The valve tool 90 and its components may be similar in dimensions and/or configuration to those of the valve tool 48, previously described. The operation of the valve tool 90 is the same or similar to that described for the valve tool 48.

While the invention has been shown in some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

I claim:

1. A valve tool for a load line container system, the load line container system having a container with a container body having an upstanding sidewall and bottom joined at a lower end of the upstanding sidewall that defines a container interior for collecting spills when liquids are discharged from a storage tank, the container body having an upper opening to facilitate accessing the container interior, a container lid that can be selectively moved between closed and open positions to selectively open and close the upper opening of the container body, a load line connected to the storage tank with a valve of the load line being external to the container interior, the valve being movable between open and closed conditions to allow or prevent fluid flow through the load line, and an end coupling of the load line being located within the container interior that is configured to couple to a transfer line that extends through a side opening formed in the sidewall of the container body, the valve tool comprising:
    an elongated valve tool handle; and
    a valve engagement portion located at one end of the elongated valve handle that is configured to engage the valve of the load line; wherein
    the valve engagement portion is configured to engage the valve of the load line when the valve is in the closed condition so that the elongated valve tool handle is located away from the container lid so that the container lid can be moved to an open position while the valve engagement portion remains engaged with the valve while the valve in in the closed condition; and wherein
    the elongated valve tool handle is further configured to extend over the container lid of the load line container system and be in close proximity to the container lid when the valve engagement portion is engaged with the valve of the load line while the valve is in the open condition and the container lid is in a closed or partially closed position so that lifting of the lid from the closed or partially closed position to access the container interior though the upper opening is prevented by the elongated valve tool handle extending over the container lid.

2. The valve tool of claim 1, wherein:
    the valve engagement portion comprises a pair of opposing jaws or arms that define a valve stem opening configured to closely receive a valve stem of the valve.

3. The valve tool of claim 2, further comprising:
    an insert or shim that defines a second valve stem opening that is configured to closely receive a second valve stem of a different size or configuration.

4. The valve tool of claim 2, wherein:
    the outer ends of the pair of jaws or arms are provided with a fastener to draw the pair of jaws or arms together to facilitate tightening of the jaws or arms around the valve stem.

5. The valve tool of claim 1, wherein:
    the valve engagement portion is configured as at least one of a valve-stem wrench, an open-end wrench, a flex-head wrench, a closed/box-end wrench, a ratcheting wrench, a socket, a ratcheting socket, an adjustable wrench, a spanner wrench, and a pipe wrench.

6. The valve tool of claim 1, wherein:
the valve engagement portion is non-releasably and stationarily mounted to the elongated valve tool handle.

7. The valve tool of claim 1, wherein:
the valve tool is non-releasably coupled to a valve stem of the valve of the load line.

8. The valve tool of claim 1, wherein:
the valve tool handle has an adjoining handle section that joins the valve engagement portion, the valve tool handle having an upward bend or curve that angles an intermediate section of the tool handle at an upward angle of from 10° to 45° from the adjoining handle section, and a second downward bend or curve that angles an end section of the tool handle at a downward angle of from 10° to 45° degrees from the intermediate section.

9. The valve tool of claim 8, wherein:
the length of the adjoining handle section of valve tool handle measured from the end of the tool engagement portion to the upward bend or curve is from 1 inches to 8 inches, the length of the intermediate section of the valve tool handle measured from the first bend or curve to the second bend is from 3 inches to 12 inches, and the length of the end section of the valve tool handle measured from the second bend or curve to the end of the valve tool handle is from 3 inches to 12 inches.

10. The valve tool of claim 1, wherein:
the valve tool handle is contoured to accommodate contours of the container lid.

11. A method of operating a valve tool for a load line container system, the load line container system having a container with a container body having an upstanding sidewall and bottom joined at a lower end of the upstanding sidewall that defines a container interior for collecting spills when liquids are discharged from a storage tank, the container body having an upper opening to facilitate accessing the container interior, a container lid that can be selectively moved between closed and open positions to selectively open and close the upper opening of the container body, a load line connected to the storage tank with a valve of the load line being external to the container interior, the valve being movable between open and closed conditions to allow or prevent fluid flow through the load line, and an end coupling of the load line being located within the container interior that is configured to couple to a transfer line that extends through a side opening formed in the sidewall of the container body, the method comprising:
providing the valve of the load line with a valve tool comprising an elongated valve tool handle and a valve engagement portion located at one end of the elongated valve handle that is configured to engage the valve of the load line, the valve engagement portion being engaged with the valve when the valve is in the closed condition so that the elongated valve tool handle is located at a position away from the container lid;
moving the container lid to an open position while the valve engagement portion remains engaged with the valve while the valve is in in the closed condition and the elongated valve tool handle is located at the position away from the container lid, whereby a user may access the container interior to facilitate coupling or uncoupling a fluid transfer line to the discharge coupling of the load line;
closing the container lid to a closed or partially closed position; and
rotating the elongated valve tool handle over the container lid of the load line container system, the elongated valve tool handle being configured to extend over and be in close proximity to the container lid when the valve engagement portion is engaged with the valve of the load line while the valve is in the open condition and the container lid is in the closed or partially closed position so that lifting of the lid from the closed or partially closed position to access the container interior though the upper opening is prevented by the elongated valve tool handle extending over the container lid.

12. The method of claim 11, wherein:
the valve engagement portion comprises a pair of spaced apart jaws or arms that define a valve stem opening configured to closely receive a valve stem of the valve.

13. The method of claim 12, further comprising:
an insert or shim that defines a second valve stem opening that is configured to closely receive a second valve stem of a different size or configuration.

14. The method of claim 12, wherein:
the outer ends of the pair of jaws or arms are provided with a fastener to draw the pair of jaws or arms together to facilitate tightening of the jaws or arms around the valve stem.

15. The method of claim 11, wherein:
the valve engagement portion is configured as at least one of a valve-stem wrench, an open-end wrench, a closed/box-end wrench, a socket, an adjustable wrench, a spanner wrench, and a pipe wrench.

16. The method of claim 11, wherein:
the valve engagement portion is non-releasably and stationarily mounted to the elongated valve tool handle.

17. The method of claim 11, wherein:
the valve tool is non-releasably coupled to a valve stem of the valve of the load line.

18. The method of claim 11, wherein:
the valve tool handle has an adjoining handle section that joins the valve engagement portion, the valve tool handle having an upward bend or curve that angles an intermediate section of the tool handle at an upward angle of from 10° to 45° from the adjoining handle section, and a second downward bend or curve that angles an end section of the tool handle at a downward angle of from 10° to 45° degrees from the intermediate section.

19. The valve tool of claim 18, wherein:
the length of the adjoining handle section of valve tool handle measured from the end of the tool engagement portion to the upward bend or curve is from 1 inches to 8 inches, the length of the intermediate section of the valve tool handle measured from the first bend or curve to the second bend is from 3 inches to 12 inches, and the length of the end section of the valve tool handle measured from the second bend or curve to the end of the valve tool handle is from 3 inches to 12 inches.

20. A method of operating a load line of a storage tank, the storage tank being provided with a load line container system, the load line container system having a container with a container body having an upstanding sidewall and bottom joined at a lower end of the upstanding sidewall that defines a container interior for collecting spills when liquids are discharged from the storage tank, the container body having an upper opening to facilitate accessing the container interior, a container lid that can be selectively moved between closed and open positions to selectively open and close the upper opening of the container body, a load line connected to the storage tank with a valve of the load line being external to the container interior, the valve being movable between open and closed conditions to allow or prevent fluid flow through the load line, and a discharge coupling of the load line being located within the container interior that is configured to couple to a transfer line that extends through a side opening formed in the sidewall of the container body, the method comprising:

providing the valve of the load line with a valve tool comprising an elongated valve tool handle and a valve engagement portion located at one end of the elongated valve handle that is configured to engage the valve of the load line, the valve engagement portion being engaged with the valve when the valve is in the closed condition so that the elongated valve tool handle is located at a position away from the container lid;

moving the container lid to an open position while the valve engagement portion remains engaged with the valve while the valve is in in the closed condition and the elongated valve tool handle is located at the position away from the container lid     coupling a fluid transfer line to the discharge coupling of the load line located within the container interior;

closing the container lid to a closed or partially closed position; and     rotating the elongated valve tool handle over the container lid of the load line container system, the elongated valve tool handle being configured to extend over and be in close proximity to the container lid when the valve engagement portion is engaged with the valve of the load line while the valve is in the open condition and the container lid is in the closed or partially closed position so that lifting of the lid from the closed or partially closed position to access the container interior though the upper opening is prevented by the elongated valve tool handle extending over the container lid;

discharging any fluid from the load line to the fluid transfer line to a selected location;

rotating the elongated valve tool handle to a position away from the container lid with the valve engagement portion being engaged with the valve so that the valve is moved to the closed condition;

opening the container lid to access the container interior while the valve remains in the closed condition; and     uncoupling the fluid transfer line from the discharge coupling within the container interior; and optionally closing the container lid.

\* \* \* \* \*